(12) United States Patent
Shimada et al.

(10) Patent No.: US 8,300,511 B2
(45) Date of Patent: Oct. 30, 2012

(54) OPTICAL INFORMATION RECORD/REPRODUCTION APPARATUS AND REPRODUCTION APPARATUS

(75) Inventors: Kenichi Shimada, Yokohama (JP); Toshiki Ishii, Yokohama (JP); Taku Hoshizawa, Hayama (JP); Motoyuki Suzuki, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/089,837

(22) Filed: Apr. 19, 2011

(65) Prior Publication Data
US 2012/0026856 A1 Feb. 2, 2012

(30) Foreign Application Priority Data
Jul. 28, 2010 (JP) ................................ 2010-168807

(51) Int. Cl.
G11B 7/00 (2006.01)
(52) U.S. Cl. .................................................... 369/103
(58) Field of Classification Search .................. 369/103; 359/3, 10, 11, 22, 27, 32
See application file for complete search history.

(56) References Cited

U.S. PATENT DOCUMENTS

| | | | |
|---|---|---|---|
| 2007/0206255 A1* | 9/2007 | Yamakage et al. | 359/25 |
| 2008/0219128 A1* | 9/2008 | Ide et al. | 369/103 |
| 2009/0073850 A1* | 3/2009 | Ide et al. | 369/103 |
| 2009/0080318 A1* | 3/2009 | Tatsuta et al. | 369/112.07 |
| 2009/0161519 A1* | 6/2009 | Yamamoto et al. | 369/103 |

FOREIGN PATENT DOCUMENTS

JP 2004-272268 9/2004

OTHER PUBLICATIONS

H. Noichi, et al., "Collinear phase-lock holography for hologram memories of the next generation", IWHM, 2008 Digests, pp. 42-43.

* cited by examiner

*Primary Examiner* — Thang Tran
(74) *Attorney, Agent, or Firm* — McDermott Will & Emery LLP

(57) ABSTRACT

A holographic memory apparatus comprises first phase modulation means that adds phase information to each pixel of a signal beam to generate page data at recording time; oscillator light generation means that generates an oscillator light that is superimposed on, and interferes with, a diffracted light from a holographic recording medium at reproduction time; second phase modulation means that adds phase information to the oscillator light; and light detection means that detects an interference light generated by superimposing the oscillator light and the diffracted light from the holographic recording medium.

7 Claims, 10 Drawing Sheets

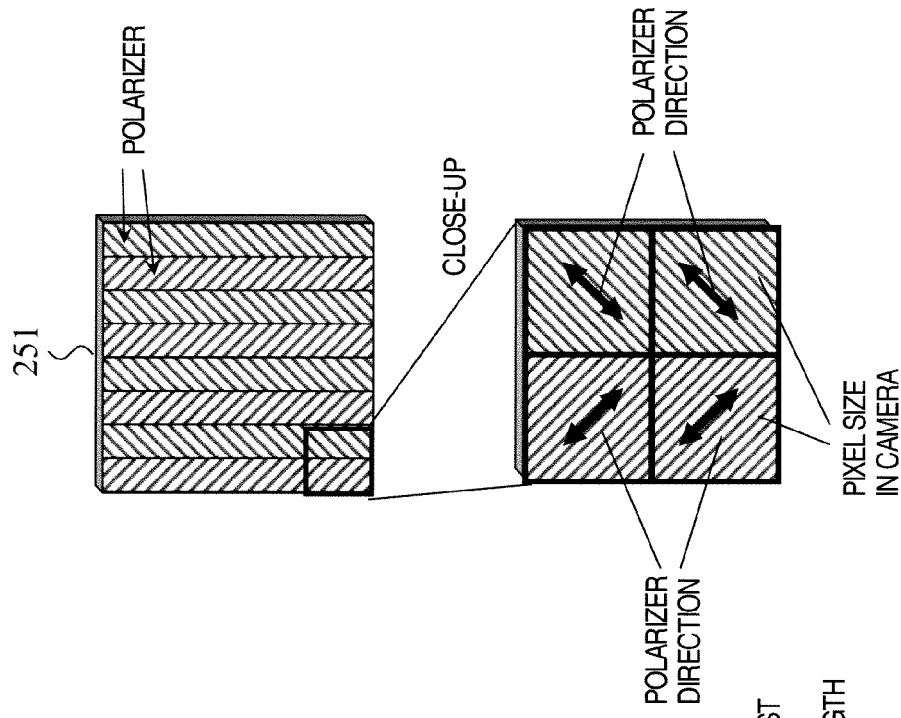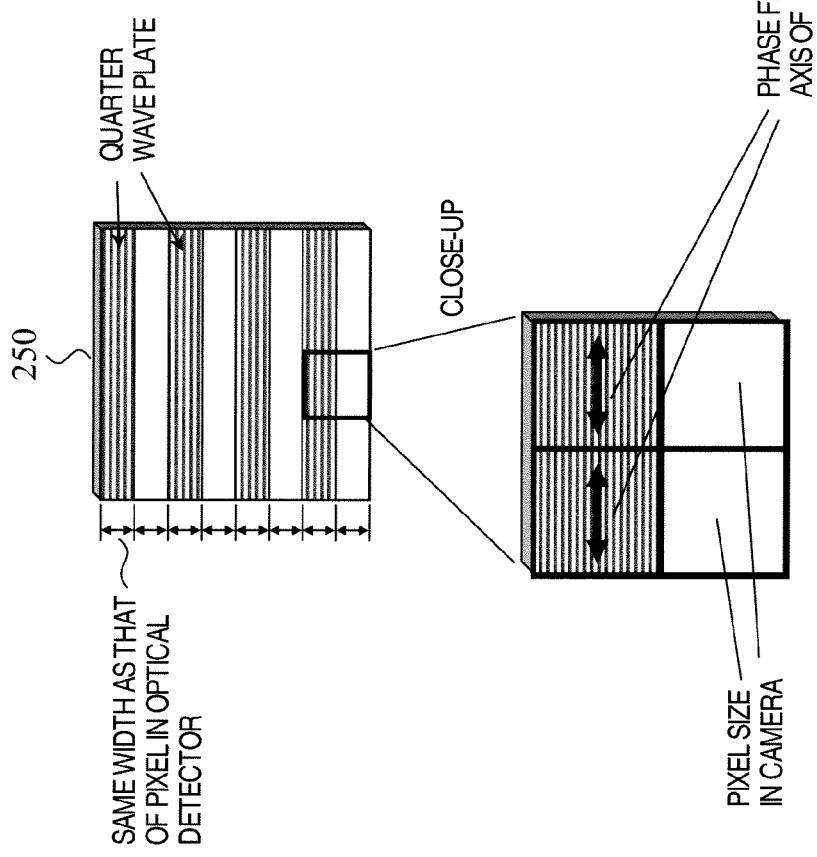

PHASE
DISTRIBUTION $2\pi$ $0$

OPTICAL INFORMATION RECORD/REPRODUCTION APPARATUS AND REPRODUCTION APPARATUS

INCORPORATION BY REFERENCE

The present application claims priority from Japanese application JP2010-168807 filed on Jul. 28, 2010, the content of which is hereby incorporated by reference into this application.

BACKGROUND OF THE INVENTION

The present invention relates to a holographic memory apparatus that records and reproduces information to and from an optical information recording medium.

Today, an optical disc with the recording capacity of about 50 GB, to and from which information is written and read using a blue-violet semiconductor laser according to the Blu-ray Disc (BD) standard, is placed on the market. In the optical storage field, it is expected that a large-capacity optical disc with the recording capacity of 100 GB to 1 TB, comparable to that of an HDD (Hard Disk Drive), will be placed on the market.

However, the implementation of such a large-capacity optical disc requires a new storage technology different from the trend of the conventional high-density technology where much work has been done on a shorter wavelength and a higher NA objective lens.

Among the researches on the next-generation optical storage technology, attention is paid to the holographic recording technology for recording digital information using holography.

The holographic recording technology is a technology that superimposes a signal beam, which has page data information modulated two-dimensionally by a spatial light modulator, and a reference beam in a recording medium and, using the resulting interference fringe pattern, records the information by causing refractive index modulation in the recording medium.

When information is reproduced, the reference beam used for recording is irradiated on the recording medium in the same arrangement. Then, the hologram recorded in the recording medium acts as a diffraction grating to generate a diffracted light. This diffracted light is reproduced as the light, identical to the recorded signal beam, including the phase information.

The reproduced signal beam is detected quickly and two-dimensionally using an optical detector such as a CMOS or a CCD. In this way, holographic recording allows two-dimensional information to be recorded/reproduced at a time in one hologram, and multiple pieces of page data to be superimposed in the same position, thus recording/reproducing a large amount of information speedily and efficiently.

One of the holographic recording technologies is disclosed, for example, in JP-A-2004-272268 (Patent Document 1). This document describes the so-called angular multiplexing recording method in which a signal beam is focused on an optical information recording medium via a lens and, at the same time, the reference beam, which is a plane wave, is irradiated to cause interference with the signal beam for holographic recording and, while changing the incidence angle of the reference beam that falls on the optical recording medium, different page data is displayed on a spatial light modulator for multiple recording.

As the means for increasing the storage capacity of the holographic recording technology, a method is proposed in which multi-level phase information is added to the pixels of the signal beam. H. Noichi, H. Horimai, P. B. Lim, K. Watanabe and M. Inoue, "Collinear phase-lock holography for memories of the next generation" 12008 Digests, 42-43 (2008). (Non-Patent Document 1)

SUMMARY OF THE INVENTION

However, Non-Patent Document 1 does not disclose the specific configuration of the holographic memory apparatus and the phase information detection method wherein the holographic memory apparatus comprises detection means for recording page data, composed of the pixels to each of which multi-level phase information is added, and for detecting the phase information added to the pixels of the page data.

Therefore, it is an object of the present invention to provide a holographic memory apparatus that allows for phase multi-level recording/reproduction and realizes a large memory capacity.

In view of the problems described above, the present invention solves the problems, for example, by the configuration described in the claims.

According to the present invention, a holographic memory apparatus may be implemented that allows for phase multi-level recording/reproduction and realizes a large memory capacity.

Other objects, features and advantages of the invention will become apparent from the following description of the embodiments of the invention taken in conjunction with the accompanying drawings.

BRIEF DESCRIPTION OF THE DRAWINGS

FIGS. 7A and 7B are configuration diagrams showing the second phase modulation means in the second embodiment.

FIGS. 9A and 9B are general diagrams showing the phase state of the oscillator light.

DETAILED DESCRIPTION OF THE INVENTION

The present invention relates to a holographic memory apparatus capable of phase multi-level recording/reproduction. This holographic memory apparatus can record page data to which phase information is added and can detect the phase information added to the pixels of the page data to reproduce the information. Embodiments of the present invention will be described below.

First Embodiment

Figure 1:
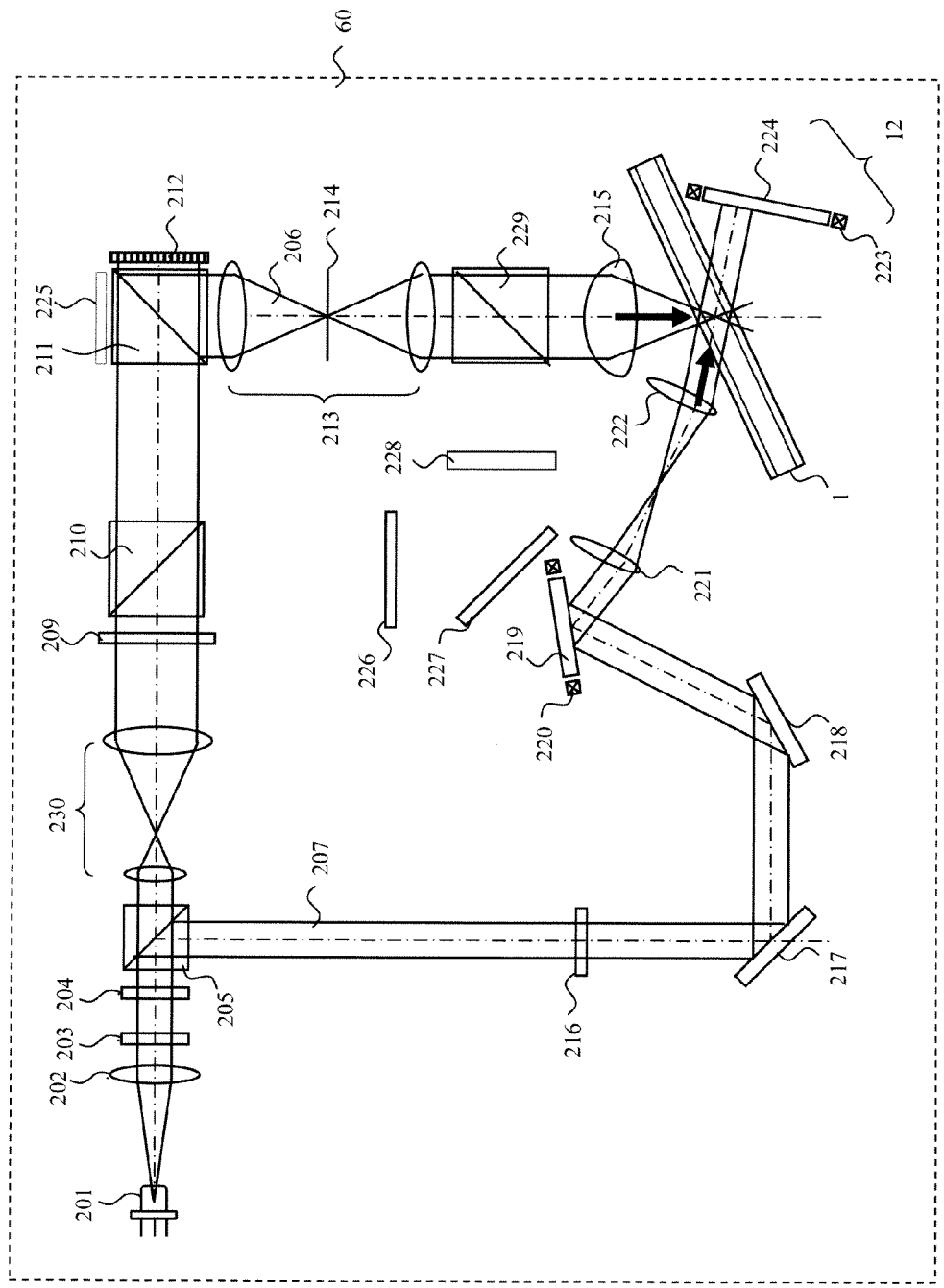
FIG. 1 is a general diagram showing the recording-time state of an optical pickup apparatus in a first embodiment.

FIG. 1 is a general diagram showing a first embodiment of an optical pickup apparatus 60 of the present invention when information is recorded. The optical beam emitted from a light source 201 transmits through a collimate lens 202 and enters a shutter 203. When the shutter 203 is open, the optical beam passes through the shutter 203, has its polarization direction controlled by a polarization direction conversion element 204, configured by a half wave plate, so that the ratio between P-polarized light and S-polarized light becomes a desired ratio and, after that, enters a polarizing beam splitter 205.

Figure 10A:
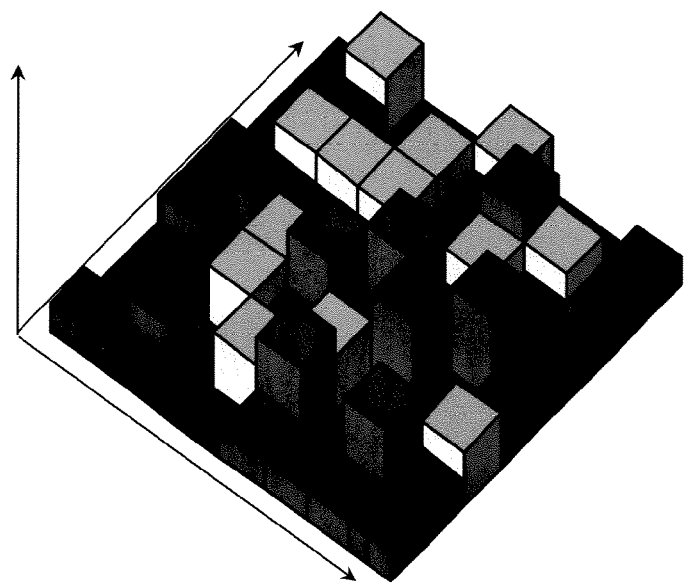
FIGS. 10A and 10B are diagrams showing the phase distribution of page data.
Figure 10B:
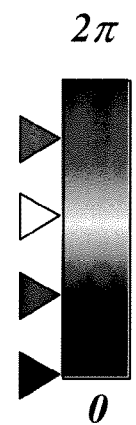

The optical beam that has passed through the polarizing beam splitter 205 has its optical beam diameter expanded by a beam expander 230 and, via a polarization direction conversion element 209, a polarizing beam splitter 210, and a polarizing beam splitter 211, enters a spatial light modulator 212. The optical beam is changed by the spatial light modulator 212 to page data to which phase information is added to the pixels as shown in FIGS. 10A and 10B. The phase distribution in the page data is, for example, a phase distribution in which the DC intensity (the so-called hot spot) is removed from the optical intensity distribution on the Fourier plane of an optical information recording medium 1. Doing so eliminates the need for the phase mask that is conventionally used to reduce the DC intensity. In one example, the phase distribution is the one in which the average value of the phases added to the pixels is $\pi$. In another example, the phase distribution is the one in which the average value of the phases added to the pixels is $0.5\pi$ or $1.5\pi$. In still another example, the phase distribution is the one in which the number of pixels where the phases are randomized in one page with phase=0 as the base is equal to the number of pixels where the phases are randomized with phase $\pi$ as the base.

It should be noted that the spatial light modulator 212 is not limited to a spatial light modulator that has the phase modulation function only. The spatial light modulator 212 with the amplitude modulation function allows for spatially amplitude modulation.

A signal beam 206, which has been produced by changing the optical beam to page data by the spatial light modulator 212, reflects on the polarizing beam splitter 211 and propagates through a relay lens 213 and a spatial filter 214. After that, the signal beam 206 transmits through a non-polarizing beam splitter 229 and is focused on the optical information recording medium 1 by an objective lens 215.

On the other hand, the optical beam reflected on the polarizing beam splitter 205 acts as a reference beam 207 and has its polarization direction determined by a polarization direction conversion element 216 into a predetermined polarization direction according to the operation to be performed, record or reproduction. After that, via a mirror 217 and a mirror 218, the optical beam reaches a mirror 219. The angle of the mirror 219 is adjustable by an actuator 220. After passing through a lens 221 and a lens 222, the optical beam reaches the optical information recording medium 1.

By irradiating the signal beam 206 and the reference beam 207 on the optical information recording medium 1 as described above in such a way that they are superimposed with each other, an interference fringe pattern is formed on the recording medium and, by writing this pattern on the recording medium, the information is recorded. In addition, because the mirror 219 may change the incidence angle of the reference beam 207 that reaches the optical information recording medium 1, the information may be recorded through angular multiplexing.

Figure 2:
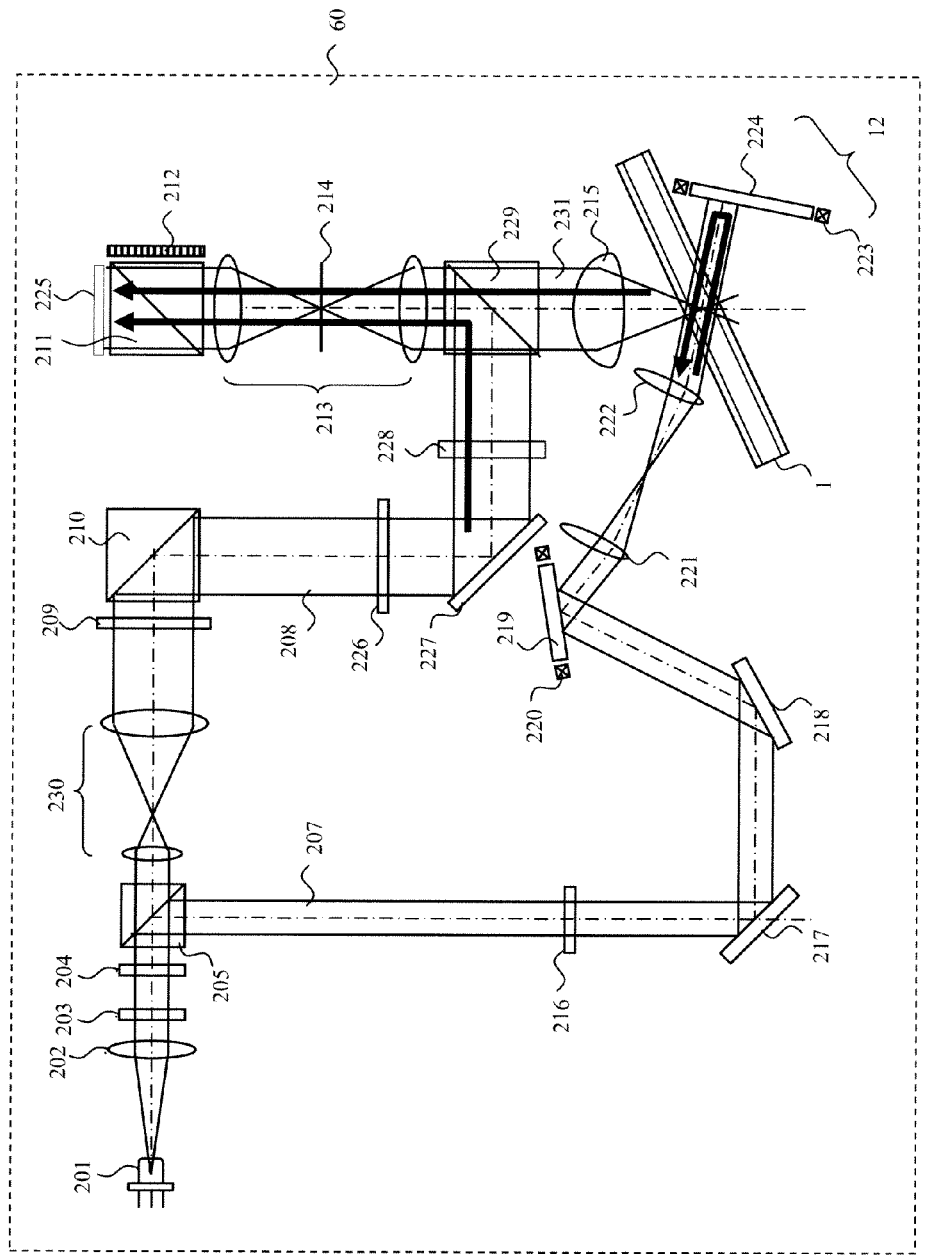
FIG. 2 is a general diagram showing the reproduction-time state of the optical pickup apparatus in the first embodiment.

FIG. 2 is a diagram showing the reproduction operation in this embodiment. The reference beam 207 reaches the optical information recording medium 1 via the same optical path that followed at the recording time. In this embodiment, the reproduction method by means of the phase-conjugate light is used where the information is reproduced using the reference beam 207 that reflects on a mirror 224, actuated by an actuator 223, and re-enters the optical information recording medium 1. A diffracted light 231 diffracted from the optical information recording medium 1 enters a camera 225 via the objective lens 215, non-polarizing beam splitter 229, relay lens 213, spatial filter 214, and polarizing beam splitter 211.

To generate an oscillator light 208 that will interfere with the diffracted light 231 in the camera 225, the polarization direction is controlled by the polarization direction conversion element 204 to allow a desired quantity of light to be transmitted through the polarizing beam splitter 205. The oscillator light 208 that has transmitted through the polarizing beam splitter 205 transmits through the beam expander 230, has its polarization direction controlled by the polarization direction conversion element 209, and reflects on the polarizing beam splitter 210. After that, the oscillator light 208 has its polarization direction changed 90 degrees by a half wave plate 226, reflects on a mirror 227, and enters a spatial light modulator 228. The spatial light modulator 228 adds at least four phases, that is, a predetermined reference phase and the phases shifted by 90 degrees, 180 degrees, and 270 degrees from the reference phase, to the oscillator light 208. The oscillator light 208 reflected on the non-polarizing beam splitter 229 enters the camera 225 via the relay lens 213, spatial filter 214, and polarizing beam splitter 211, and is superimposed on, and interferes with, the diffracted light 231 described above.

Figure 3:
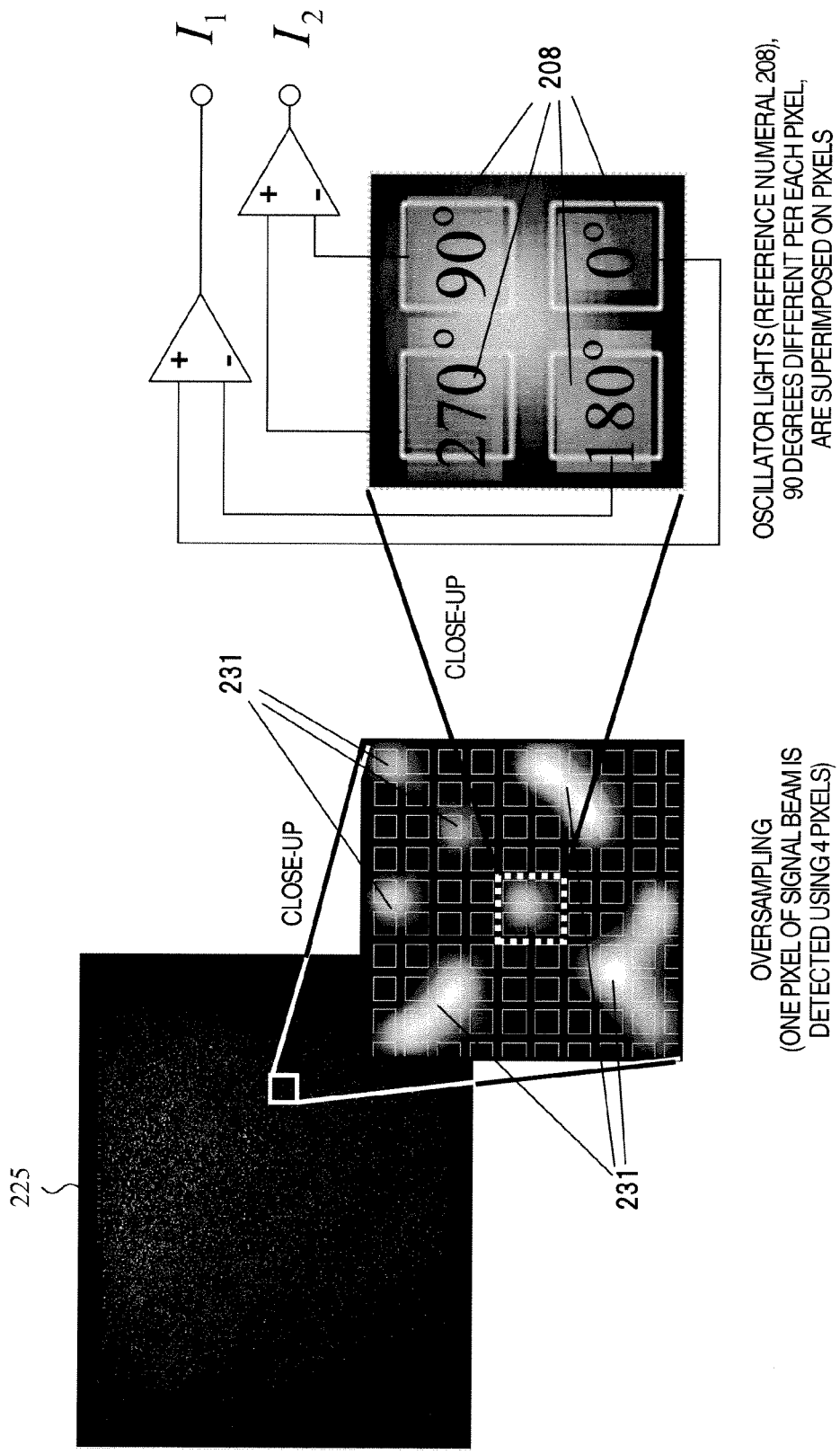
FIG. 3 is a general diagram showing the relative position between the pixels on a camera and the diffracted light and the oscillator light in the first embodiment.

FIG. 3 is a general diagram showing the arrangement of the pixels in the camera 225 and the positional relation between the diffracted light 231 and the oscillator light 208. Although FIG. 3 shows the page data that is phase-modulated and amplitude-modulated, the page data may be white page data that is not amplitude-modulated. The pixels on the camera are arranged so that at least four pixels are used for performing oversampling for each pixel of the page data. The pixels are configured in such a way that the oscillator light 208, to which the four phases described above (reference phase (0° is used in this embodiment for convenience), reference phase+90°, reference phase+180°, and reference phase+270°) are added, falls on each of the four pixels used for the oversampling. $I_1$ and $I_2$ shown in the figure are calculated as following. $I_1$ is calculated by subtracting the output value of the pixel, on which the oscillator light 208 (reference phase+180° is added) falls, from the output value of the pixel on which the oscillator light 208 (reference phase is added) falls; $I_2$ is calculated by subtracting the output value of the pixel, on which the oscillator light 208 (reference phase+90° is added) falls, from the output value of the pixel on which the oscillator light 208 (reference phase+270° is added) falls.

Although FIG. 3 depicts the positional relation between the diffracted light 231 and the oscillator light 208 for a part the pixels of the camera 225 for the sake of description, it is assumed, in this embodiment, that the same positional relation is satisfied basically for all combinations of the four pixels used for the oversampling.

Figures 9A, 9B:
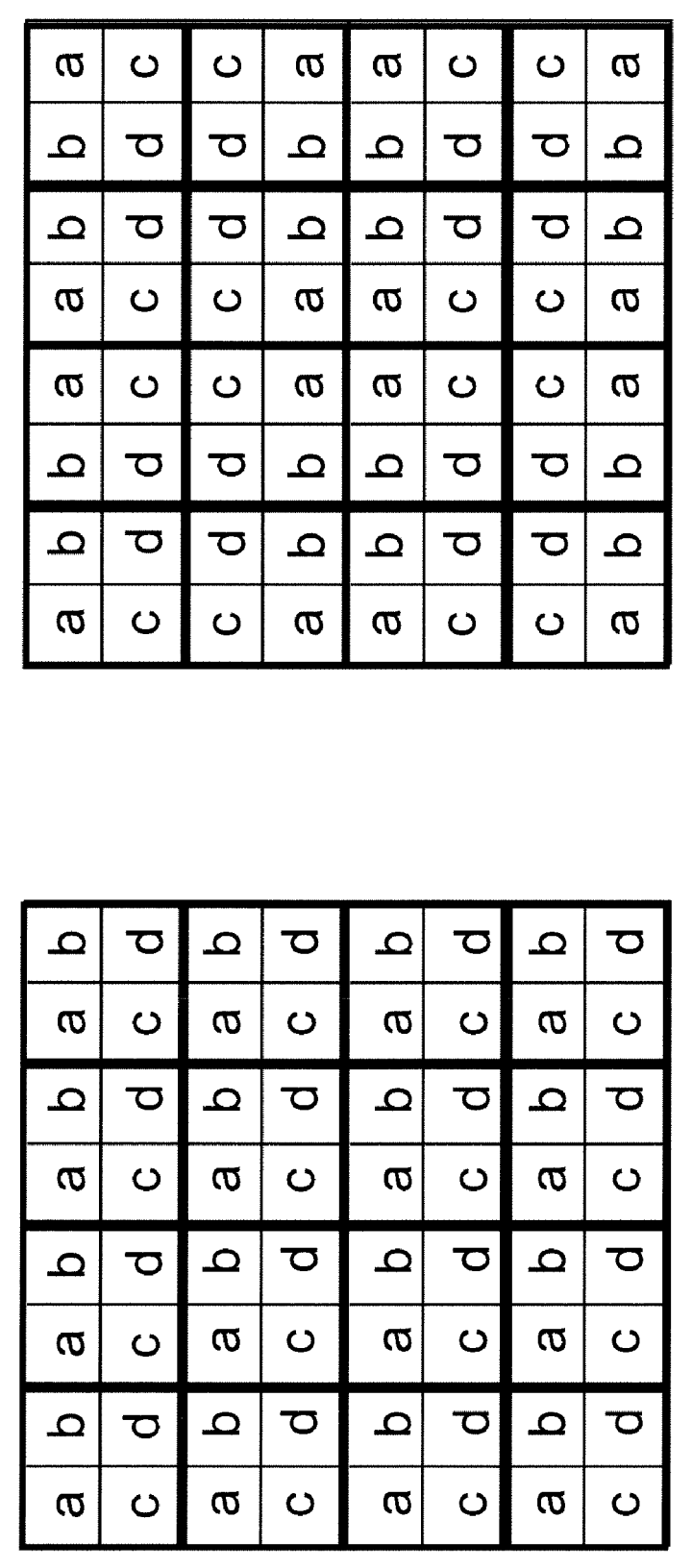

The phase states of the oscillator light 208 that falls on at least four pixels used for the oversampling may be that the four phase states described above (for convenience, the four phase states are indicated as a, b, c, and d) are in the positional relation such as the one shown in FIG. 9A or the positional relation such as the one shown in FIG. 9B. The configuration shown in FIG. 9B allows the neighboring four pixels to be in the same phase state, thereby streamlining the processing.

In the configuration described above, based on the principle of the fringe scan method generally used for an interferometer, the phase difference $\Delta\phi$ between the diffracted light 231 falling on each pixel and the reference phase added to the oscillator light 208 may be calculated by (Expression 1) using $I_1$ and $I_2$ defined in FIG. 3. Therefore, the phase information added to each pixel of the page data may be detected.

[Expression 1]

$$\Delta\phi = \tan^{-1}\left(\frac{I_2}{I_1}\right) \quad \text{Expression 1}$$

As described above, this embodiment makes it possible to implement a holographic memory apparatus that performs phase multi-level recording/reproduction and realizes a large-capacity memory. This apparatus also increases the amount of data to be reproduced at a time, thus increasing the operation speed.

To compatibly reproduce amplitude-modulated page data for which phase multi-level recording was not performed, as described in Patent Document 1, the apparatus reproduces the page data by stopping the operation of the generation means of the oscillator light 208 to stop the generation of the oscillator light.

The present invention is applicable not only to a configuration in which the principle of the fringe scan method is used but to a configuration in which another phase difference detecting mechanism or principle is used.

Second Embodiment

Figure 4:
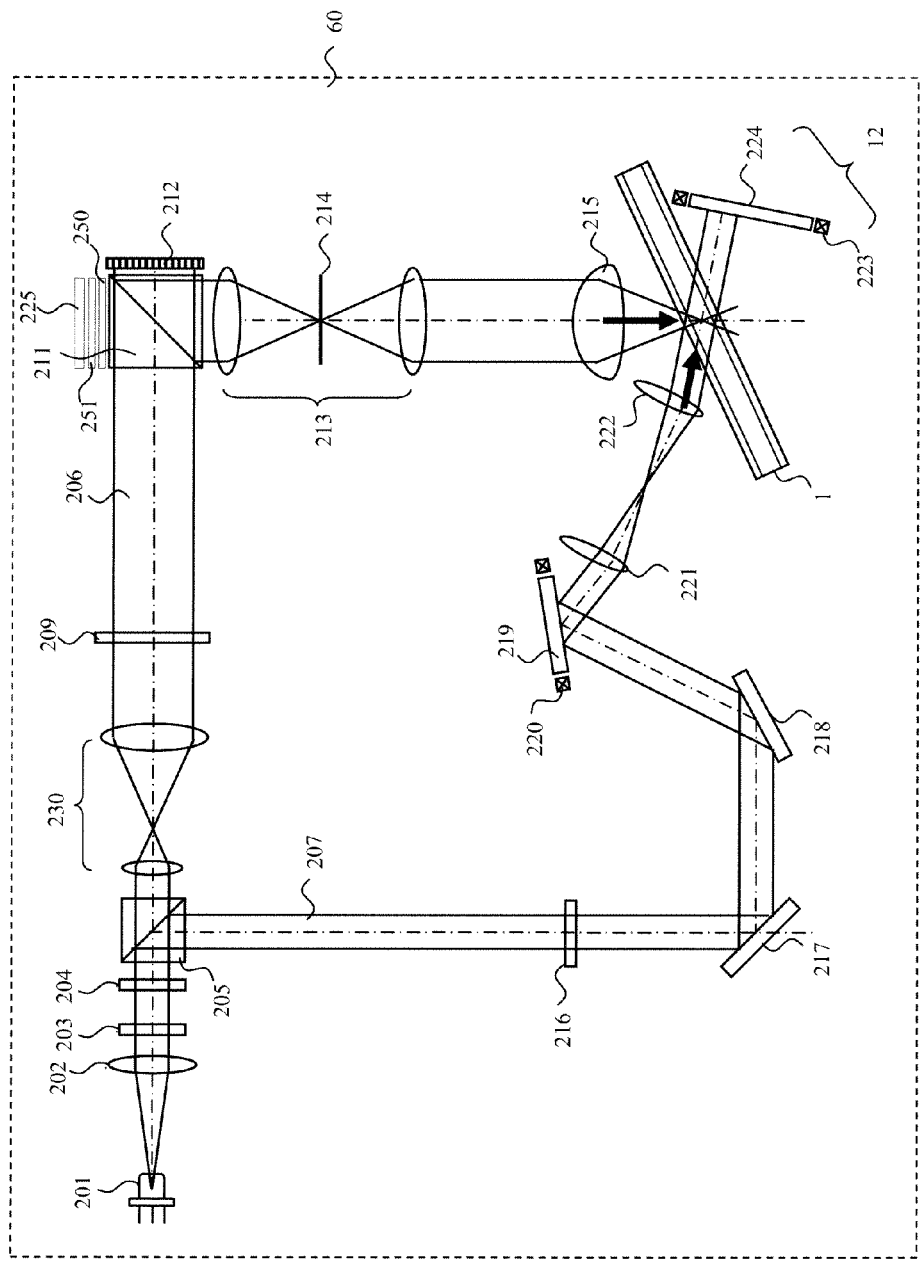
FIG. 4 is a general diagram showing the recording-time state of an optical pickup apparatus in a second embodiment.

FIG. 4 is a general diagram showing a second embodiment of an optical pickup apparatus 60 of the present invention, which aims to streamline the optical system of the first embodiment. FIG. 4 shows the recording operation.

The optical beam emitted from a light source 201 transmits through a collimate lens 202 and enters a shutter 203. When the shutter 203 is open, the optical beam passes through the shutter 203, has its polarization direction controlled by a polarization direction conversion element 204, configured by a half wave plate, so that the light quantity ratio between P-polarized light and S-polarized light becomes a desired ratio and, after that, enters a polarizing beam splitter 205.

The optical beam that has passed through the polarizing beam splitter 205 has its optical beam diameter expanded by a beam expander 230 and, via a polarization direction conversion element 209 and a polarizing beam splitter 211, enters a spatial light modulator 212. A signal beam 206, which is page data produced by the spatial light modulator 212 by adding phase information to the pixels, reflects on the polarizing beam splitter 211 and propagates through a relay lens 213 and a spatial filter 214. It should be noted that the spatial light modulator 212 is not limited to a spatial light modulator that has the phase modulation function only. The spatial light modulator 212 with the amplitude modulation function allows for spatially amplitude modulation. After that, the signal beam 206 transmits through a non-polarizing beam splitter 229 and is focused on the optical information recording medium 1 by an objective lens 215. On the other hand, the optical beam reflected on the polarizing beam splitter 205 acts as a reference beam 207 and reaches the optical information recording medium 1 in the same way as in the first embodiment described above.

Figure 5:
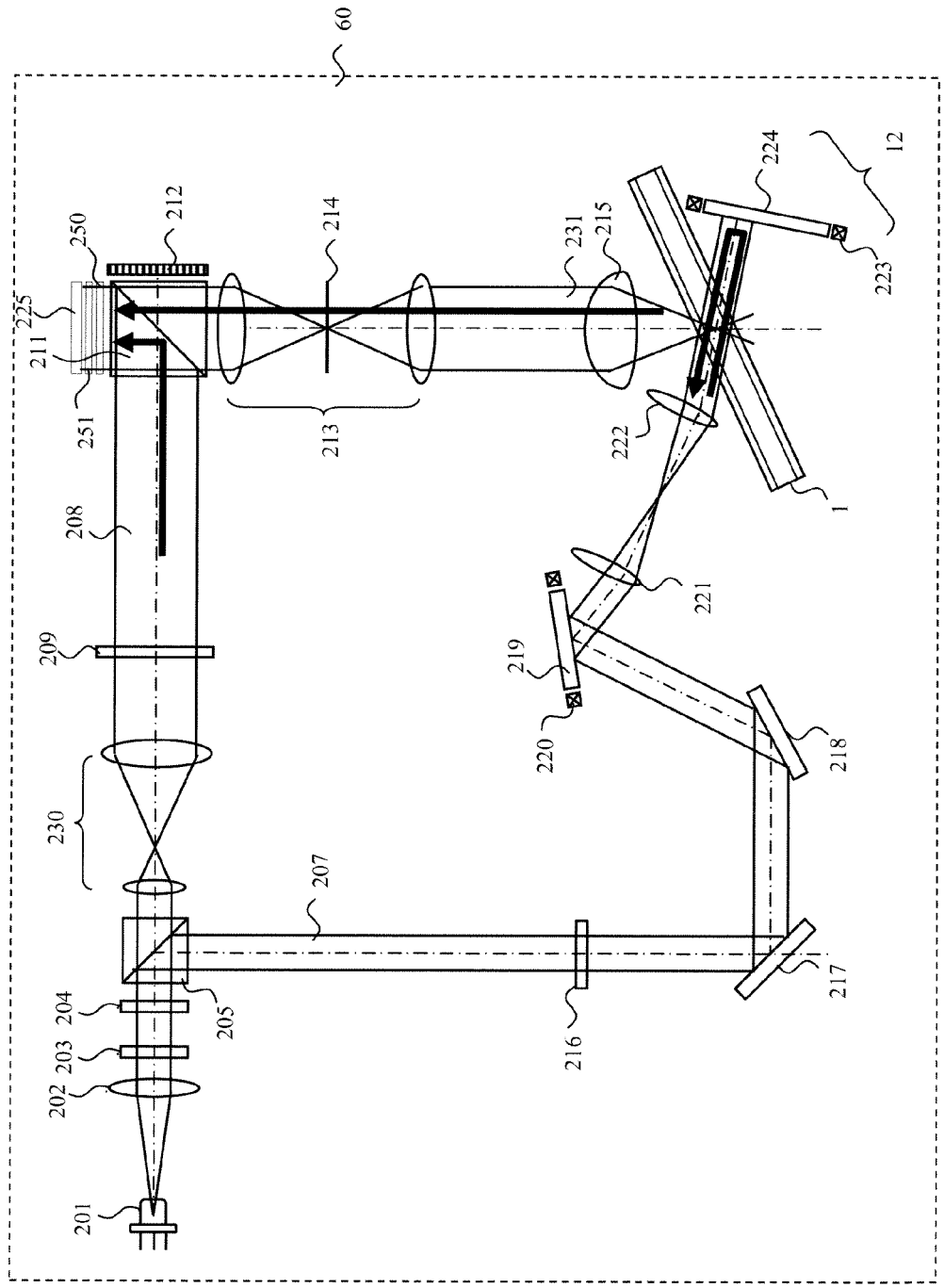
FIG. 5 is a general diagram showing the reproduction-time state of the optical pickup apparatus in the second embodiment.

FIG. 5 is a diagram showing the reproduction operation in this embodiment. The reference beam 207 reaches the optical information recording medium 1 via the same optical path followed at the recording time. In this embodiment, the reproduction method by means of the phase-conjugate light is used where the information is reproduced using the reference beam 207 that reflects on a mirror 224, actuated by an actuator 223, and re-enters the optical information recording medium 1. A diffracted light 231 diffracted from the optical information recording medium 1 enters a camera 225 via the objective lens 215, relay lens 213, spatial filter 214, polarizing beam splitter 211, optical element 250, and optical element 251.

To generate an oscillator light 208 that will interfere with the diffracted light 231 in the camera 225, the polarization direction is controlled by the polarization direction conversion element 204 to allow a desired quantity of light to be transmitted through the polarizing beam splitter 205. The oscillator light 208 that has transmitted through the polarizing beam splitter 205 transmits through the beam expander 230, has its polarization direction controlled by the polarization direction conversion element 209, and reflects on the polarizing beam splitter 211. After that, the oscillator light 208 enters the camera 225 via the optical element 250 and optical element 251 and is superimposed on, and interferes with, the diffracted light 231 described above.

Figure 6:
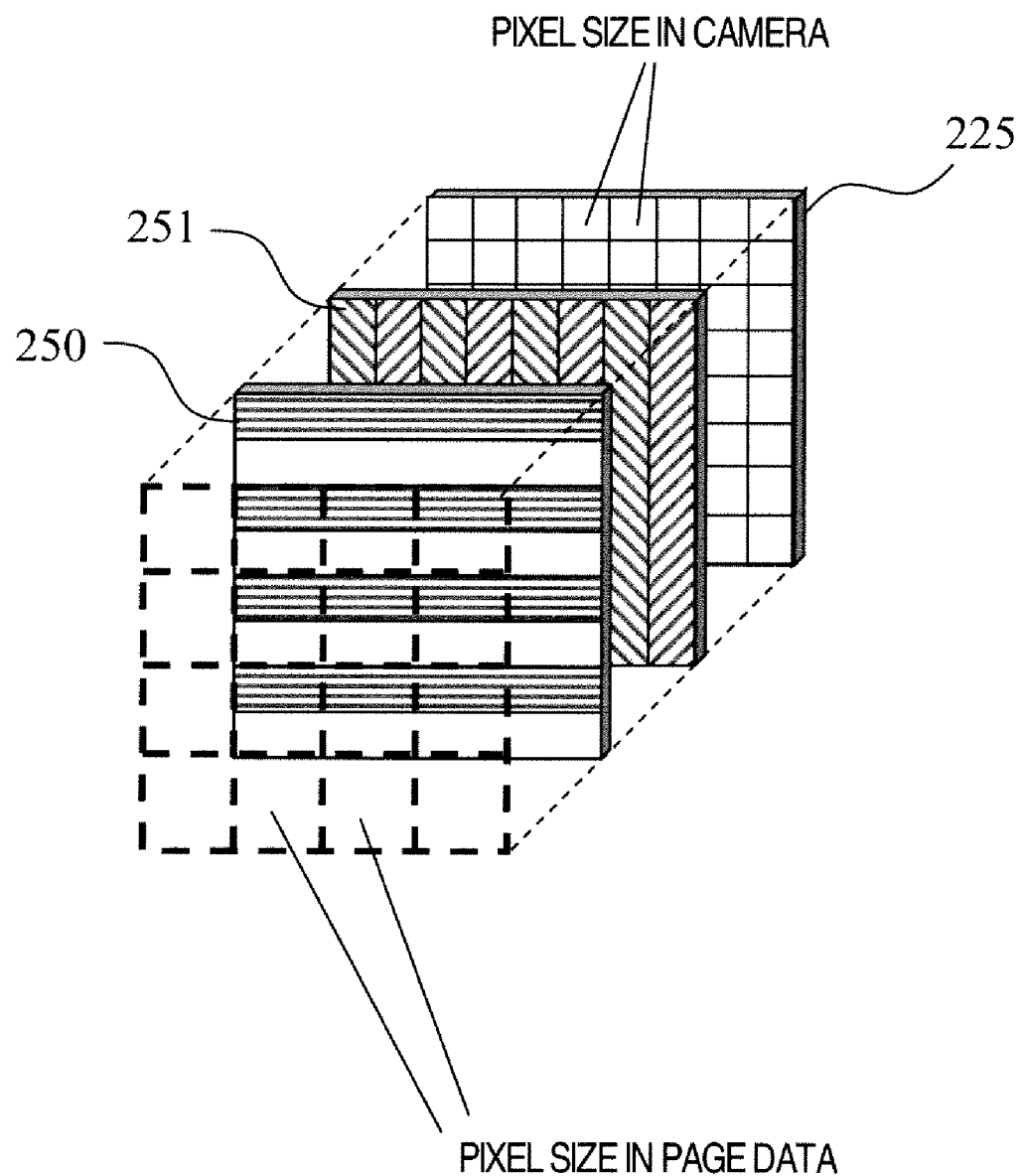
FIG. 6 is an enlarged diagram showing a second phase modulation part in the second embodiment.

In this configuration, the phase information, added to the pixels of the page data, is detected in the same method and on the same principle as in the first embodiment, the optical element 250 and the optical element 251 are installed before the camera 225 as shown in FIG. 6. For example, the elements with the configuration shown in FIGS. 7A and 7B are used.

For example, the optical element 250 is an element, a part of which is configured by a quarter wave plate, functions to advance the phase of a light, which has a polarized light with respect to a predetermined optical axis, by a quarter-wavelength. A non-hatched area in the diagram of the optical element 250 is an area that does not have a function to add a phase. That is, an area that adds a phase and an area that does not add a phase are arranged alternately.

The optical element 251 is an element configured by first polarizers through which a light with a particular polarization direction passes and second polarizers through which a light with a polarization direction at 90 degrees with that direction passes. Those elements are arranged as shown in FIG. 6 described above. The quarter wave plate and the polarizers in the optical element 250 and the optical element 251 may be configured by a fine structure, shorter than the wavelength, using a photonic crystal capable of controlling the polarization and transmission/reflection characteristics of an incident light. Because the method for detecting a phase by a photonic crystal is described in JP-A-2008-286518, the following describes only the phase relation between the diffracted light 231 and the oscillator light 208 in this embodiment.

The arrangement of the pixels in the camera 225 and the positional relation between the diffracted light 231 and the oscillator light 208 are the same as those in FIG. 3 described above. Although FIG. 3 shows the page data that is phase-modulated and amplitude-modulated, the page data may be white page data that is not amplitude-modulated. The diffracted light 231 and the oscillator light 208 added the four phase differences (reference phase (0° is used in this embodiment for convenience), reference phase+90°, reference phase+180°, and reference phase+270°) fall on each of the four pixels used for the oversampling. Although FIG. 3 depicts the positional relation between the diffracted light 231 and the oscillator light 208 for a part the pixels of the camera 225 for the sake of description, it is assumed, in the present invention, that the same positional relation is satisfied basically for all combinations of the four pixels used for the oversampling.

In the configuration described above, based on the principle of the fringe scan method generally used for an interferometer, the phase difference $\Delta\phi$ between the diffracted light 231 falling on each pixel and the reference phase added to the oscillator light 208 may be calculated by (Expression 1). Therefore, the phase information added to each pixel of the page data may be detected.

In the first embodiment, there must be a match between the oscillator light 208 and the position of each element on the camera 225 on a pixel basis. In contrast, because the optical element 250 and the optical element 251 may be integrated into the camera 225, this embodiment has the merit of eliminating the need for position adjustment at the reproduction time. Another merit is that high-quality reproduction signals may be generated because the light usage efficiency for generating the oscillator light is high.

To compatibly reproduce amplitude-modulated page data for which phase multi-level recording was not performed, as described in Patent Document 1, the apparatus reproduces the page data by stopping the operation of the generation means of the oscillator light 208 to stop the generation of the oscillator light.

Third Embodiment

Figure 8:
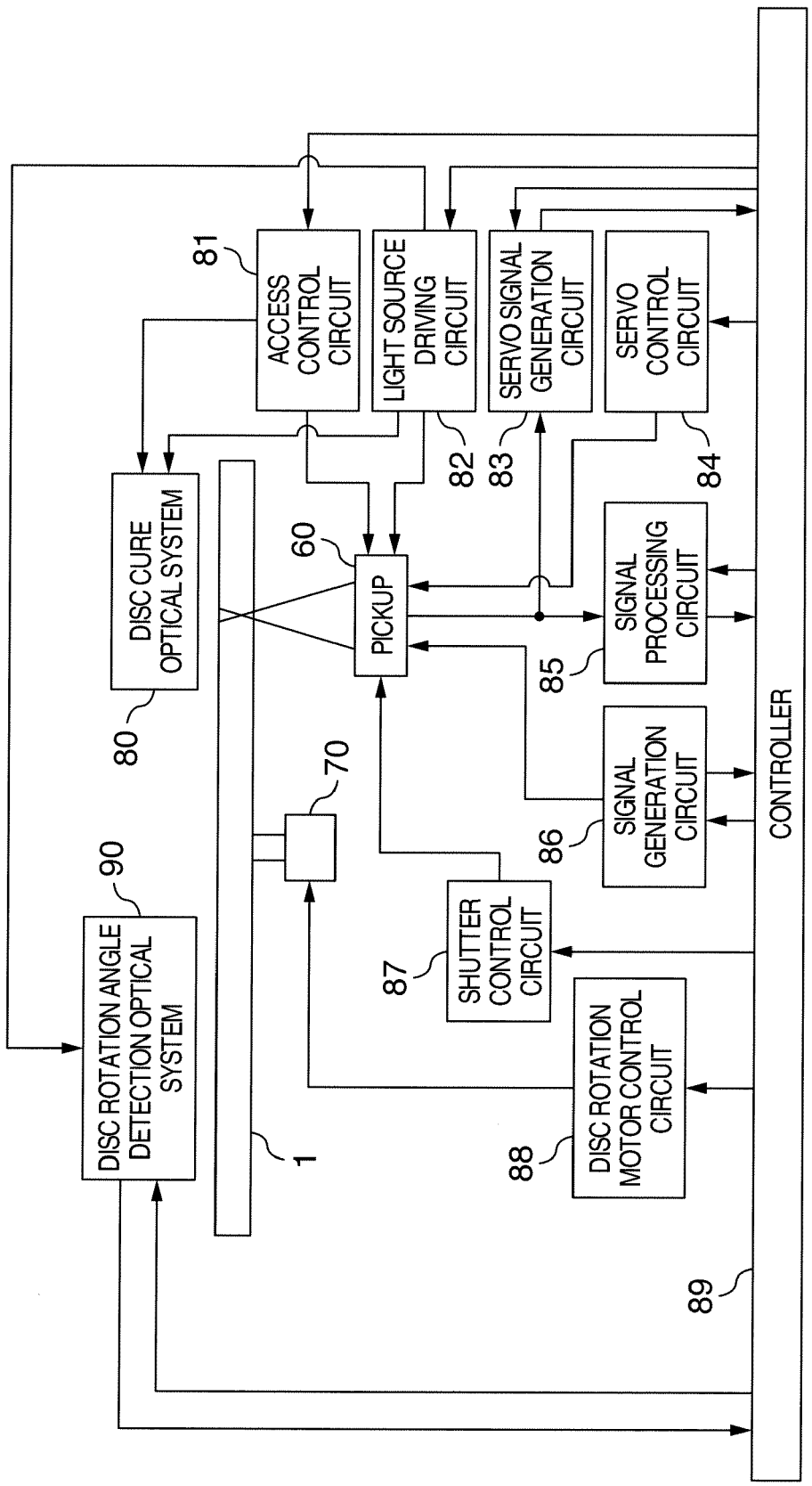
FIG. 8 is a general diagram showing a holographic memory apparatus in a third embodiment.

FIG. 8 is a diagram showing a whole configuration of a holographic memory apparatus that records and/or reproduces digital information using holography. The holographic memory apparatus comprises an optical pickup apparatus 60 with the configuration such as that shown in FIG. 1 and FIG. 4, a disc cure optical system 80, a disc rotation angle detection optical system 90, and a rotation motor 70 and has the configuration in which an optical information recording medium 1 may be rotated by the rotation motor 70.

The optical pickup apparatus 60 emits the reference beam and the signal beam onto the optical information recording medium 1 to record digital information via holography.

At this time, the information signal to be recorded is transmitted to a spatial light modulator 212 in the optical pickup apparatus 60 by a controller 89 via a signal generation circuit 86, and the signal beam is modulated by the spatial light modulator.

To reproduce the information recorded on the optical information recording medium 1, the phase-conjugate light of the reference beam is used. The phase-conjugate light is a light wave travelling in the reverse direction while maintaining the same wave front as that of the input light. The reproduction light reproduced by the phase-conjugate light is detected by the camera 225 in the optical pickup apparatus 60, and the signal is reproduced by a signal processing circuit 85.

Irradiating time of the reference beam and the signal beam on the optical information recording medium 1 may be adjusted by controlling the open/close time of the shutter 203 in the optical pickup apparatus 60 by the controller 89 via a shutter control circuit 87.

The disc cure optical system 80 functions to generate an optical beam used for the precure and postcure of the optical information recording medium 1. The precure refers to a pre-process, activated when information is recorded in a desired position in the optical information recording medium 1, for irradiating a predetermined optical beam in advance before irradiating the reference beam and the signal beam in the desired position. The postcure refers to a post-process, activated after information is recorded in a desired position in the optical information recording medium 1, for irradiating a predetermined optical beam to prevent information from being added in the desired position.

The disc rotation angle detection optical system 90 is used for detecting the rotation angle of the optical information recording medium 1. To adjust the optical information recording medium 1 to a predetermined rotation angle, the signal corresponding to the rotation angle is detected by the disc rotation angle detection optical system 90 and, using the detected signal, the rotation angle of the optical information recording medium 1 may be controlled by the controller 89 via a disc rotation motor control circuit 88.

A predetermined light source driving current is supplied from a light source driving circuit 82 to the light source in the optical pickup apparatus 60, disc cure optical system 80, and disc rotation angle detection optical system 90 to allow an optical beam having a predetermined light quantity to be emitted from each light source.

The optical pickup apparatus 60 and the disc cure optical system 80, each of which has a mechanism for sliding its position into the radial direction of the optical information recording medium 1, can control the position via an access control circuit 81.

The holography-based recording technology, a technology for recording very-high-density information, tends to have an extremely small allowable error for the tilting and positioning of the optical information recording medium 1. Therefore, a mechanism for detecting an amount of error whose error allowance is small, such as an error in the tilting or positioning of the optical information recording medium 1, may be provided in the optical pickup apparatus 60 and a servo mechanism for generating the servo control signal via a servo signal generation circuit 83 and for correcting the amount of error via a servo control circuit 84 may be provided in the holographic memory apparatus. The optical pickup apparatus 60, disc cure optical system 80, and disc rotation angle detection optical system 90 may integrate some or all of the optical system configurations into one to simplify the configuration.

Although the recording/reproduction apparatus has been described in the embodiments described above, the present invention is applicable also to a reproduction apparatus or a reproduction method for reproducing data from an optical information recording medium on which data is recorded in advance using the signal beam in which phase information is added to the pixels.

A holographic memory apparatus, which performs phase multi-level recording/reproduction and realizes a large-capacity memory, may be implemented by a reproduction method for reproducing information from a recording medium on which the information is phase-multilevel recorded by causing interference between a reference beam and a signal beam to which phase information is added, wherein the reproduction method comprises the steps of irradiating a reference beam onto a recording medium to diffract a diffracted light; emitting an optical beam; adding phase information to the optical beam; causing interference between the optical beam to which the phase information is added and the diffracted light from the recording medium; detecting a light generated by the interference; and reproducing information recorded on the recording medium by generating the phase information added to pixels of the signal beam at recording time based on the information obtained by the detection.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A holographic memory apparatus that causes interference between a reference beam and a signal beam, records an obtained interference fringe on a holographic recording medium as page data, and reproduces the recorded page data, said holographic memory apparatus comprising:
   first phase modulator that adds phase information to each pixel of the signal beam to generate page data at recording time;
   oscillator light generation means that generates an oscillator light that is superimposed on, and interferes with, a diffracted light from the holographic recording medium at reproduction time;
   second phase modulator that adds phase information to the oscillator light; and
   light detector that detects an interference light generated by superimposing the oscillator light and the diffracted light from the holographic recording medium wherein
   said second phase modulation means adds at least four different phases to the oscillator light,
   said light detection means has pixels arranged in such a way that at least four pixels are used to oversample each pixel of the page data,
   the oscillator light, to which at least four different phases are added, irradiates on each of the at least four pixels and is superimposed on the diffracted light from said holographic recording medium, and
   the phase information added to the pixels of the signal beam is detected based on the principle of a fringe scan method.

2. The holographic memory apparatus according to claim 1 wherein
   said second phase modulator adds a predetermined reference phase, as well as phases 90 degrees, 180 degrees, and 270 degrees different from the reference phase, to the oscillator light and said light detector has the pixels arranged in such a way four pixels are used to oversample each pixel of the page data.

3. The holographic memory apparatus according to claim 1 wherein
   said first phase modulator also has an amplitude modulation function.

4. The holographic memory apparatus according to claim 1 wherein
   the data pages having multi-level phase information are recorded using an angular multiplexing recording method.

5. The holographic memory apparatus according to claim 1 wherein
   said second phase modulator is configured by an element using a photonic crystal.

6. The holographic memory apparatus according to claim 1 wherein
   when amplitude-modulated page data is reproduced, the operation of said oscillator light generation means stop the generation of the oscillator light.

7. A reproduction method for reproducing information from a recording medium on which the information is phase-multilevel recorded by causing interference between a reference beam and a signal beam to which phase information is added, said reproduction method comprising the steps of:
   irradiating a reference beam onto a recording medium to diffract a light;
   emitting an optical beam;
   adding phase information to the optical beam;
   causing interference between the optical beam to which the phase information is added and the diffracted light from the recording medium;
   detecting a light generated by the interference; and
   reproducing the phase-multilevel information added to pixels of the signal beam at recording time by the detection.

* * * * *